United States Patent
Byer et al.

(10) Patent No.: US 7,469,081 B2
(45) Date of Patent: Dec. 23, 2008

(54) REDUCING THERMAL LOAD ON OPTICAL HEAD

(75) Inventors: Mark W. Byer, Mountain View, CA (US); Manuel J. Leonardo, San Francisco, CA (US)

(73) Assignee: Mobius Photonics, Inc., Santa Clara, CA (US)

( * ) Notice: Subject to any disclaimer, the term of this patent is extended or adjusted under 35 U.S.C. 154(b) by 2 days.

(21) Appl. No.: 11/469,665

(22) Filed: Sep. 1, 2006

(65) Prior Publication Data

US 2008/0056642 A1 Mar. 6, 2008

(51) Int. Cl.
G02B 6/00 (2006.01)
G01J 3/44 (2006.01)
G02F 2/02 (2006.01)
H01S 3/13 (2006.01)

(52) U.S. Cl. .............. 385/27; 356/301; 356/330; 385/139; 372/34

(58) Field of Classification Search .............. None
See application file for complete search history.

(56) References Cited

U.S. PATENT DOCUMENTS

| | | | |
|---|---|---|---|
| 4,199,222 A | 4/1980 | Ikushima et al. | 385/92 |
| 4,606,603 A | 8/1986 | Cairns | 385/58 |
| 4,614,402 A | 9/1986 | Caron et al. | 385/62 |
| 4,642,413 A | 2/1987 | Ovshinsky | 136/249 |
| 4,666,241 A | 5/1987 | Caron | 385/85 |
| 4,741,590 A | 5/1988 | Caron | 385/60 |
| 4,741,591 A | 5/1988 | Grabe et al. | 385/98 |
| 4,749,250 A | 6/1988 | Carter | 385/52 |
| 4,768,858 A | 9/1988 | Hussein | 385/118 |
| 4,925,265 A | 5/1990 | Rink et al. | 385/33 |
| 4,925,267 A | 5/1990 | Plummer et al. | 385/74 |
| 5,231,686 A | 7/1993 | Rabinovich | 385/93 |
| 5,453,606 A | 9/1995 | Hojo | 250/201.1 |
| 5,588,086 A | 12/1996 | Fan | 385/138 |
| 5,671,311 A | 9/1997 | Stillie et al. | 385/89 |
| 5,700,084 A | 12/1997 | Yasukawa et al. | 362/275 |
| 5,737,349 A | 4/1998 | Gaebe | 372/37 |
| 5,745,284 A | 4/1998 | Goldberg et al. | 359/344 |
| 5,793,012 A * | 8/1998 | Ortiz, Jr. | 219/121.6 |
| 5,812,583 A | 9/1998 | Petersen | 372/75 |

(Continued)

FOREIGN PATENT DOCUMENTS

EP 1189241 3/2002

(Continued)

OTHER PUBLICATIONS

P. G. Kazansky, et al., "Blue-light generation by quasi-phase-matched frequency doubling in thermally poled optical fibers", *Optics Letters*, 20, pp. 843, 1995.

(Continued)

*Primary Examiner*—Tina M Wong
(74) *Attorney, Agent, or Firm*—Joshua D. Isenberg; JDI Patent

(57) ABSTRACT

Methods and apparatus for reducing a thermal load on an optical head are described. Waste light is captured at one or more locations in the optical head and directed to a location that is thermally isolated from the one or more locations in the optical head using or more optical fibers.

46 Claims, 3 Drawing Sheets

U.S. PATENT DOCUMENTS

| | | | |
|---|---|---|---|
| 5,857,054 A | 1/1999 | Thomas et al. | 385/134 |
| 6,151,338 A | 11/2000 | Grubb et al. | 372/6 |
| 6,210,046 B1 | 4/2001 | Rogers et al. | 385/74 |
| 6,215,580 B1 | 4/2001 | Kouta | 359/328 |
| 6,234,688 B1 | 5/2001 | Boger et al. | 385/92 |
| 6,281,471 B1 | 8/2001 | Smart | 219/121.62 |
| 6,297,903 B1 | 10/2001 | Grubb et al. | 359/341.3 |
| 6,320,706 B1 | 11/2001 | Richard et al. | 359/822 |
| 6,335,941 B1 | 1/2002 | Grubb et al. | 372/6 |
| 6,340,806 B1 | 1/2002 | Smart et al. | 219/121.62 |
| 6,366,593 B1 | 4/2002 | Richard et al. | 372/36 |
| 6,541,731 B2 | 4/2003 | Mead et al. | 219/121.7 |
| 6,590,698 B1 | 7/2003 | Ohtsuki et al. | 359/326 |
| 6,678,294 B1 | 1/2004 | Komine et al. | 372/38.01 |
| 6,690,696 B2 | 2/2004 | Byren et al. | 372/35 |
| 6,703,582 B2 | 3/2004 | Smart et al. | 219/121.62 |
| 6,711,187 B2 | 3/2004 | Tanner et al. | 372/30 |
| 6,727,458 B2 | 4/2004 | Smart | 219/121.62 |
| 6,860,651 B2 | 3/2005 | DeRosa et al. | 385/92 |
| 6,891,608 B2 | 5/2005 | Byer et al. | 356/153 |
| 7,039,076 B2 | 5/2006 | Kane et al. | 372/6 |
| 7,385,752 B1 | 6/2008 | Starodoumov et al. | 359/326 |
| 2003/0215207 A1* | 11/2003 | DeRosa et al. | 385/139 |
| 2004/0146078 A1* | 7/2004 | Nield et al. | 372/34 |
| 2004/0160601 A1* | 8/2004 | Womble et al. | 356/301 |
| 2005/0248831 A1* | 11/2005 | Schilling-Benz et al. | 359/330 |
| 2007/0086016 A1* | 4/2007 | Rothenberg | 356/450 |
| 2007/0129775 A1* | 6/2007 | Mordaunt et al. | 607/88 |

FOREIGN PATENT DOCUMENTS

EP    1195630    4/2002

OTHER PUBLICATIONS

Newport Corporation Website "Tutorials: Opto-Mechanical Components, Kinematic Mounts" available online at http://www.newport.com/Support/Tutorials/OptoMech/om3.asp, Copyright@1996-2002, Newport Corporation.

The International Search Report and the Written Opinion of the International Searching Authority dates Apr. 3, 2008- International Application No. PCT/US2007/077502.

* cited by examiner

REDUCING THERMAL LOAD ON OPTICAL HEAD

FIELD OF THE INVENTION

This invention generally relates to lasers and optical amplifiers and more particularly to thermal management in wavelength converted optical systems.

BACKGROUND OF THE INVENTION

High-powered optical sources have many applications in which an intense beam of light is focused onto a substrate or other target. In many high-power optical source architectures, a signal from a seed source is fed into an optical amplifier that amplifies the power of the signal. One example, among others, of such a high-power optical source architecture is referred as a master oscillator, power amplifier (MOPA) architecture. The MOPA architecture allows precise pulsing of the amplified output. Laser systems based on optical amplification of seed signals are often used in high power applications, such as laser micromachining.

Many high power optical systems make use of wavelength conversion to produce light having a desired wavelength or range of wavelengths. Often the process of conversion involves performing some non-linear optical wavelength conversion on input light from a source, such as a MOPA source. The non-linear conversion efficiency may have less than perfect conversion efficiency. Furthermore, the non-linear conversion efficiency may be adjustable. Consequently not all of the input light is necessarily converted to "useful" wavelength converted light. As such, some unconverted input light may remain as waste light. Such waste light may contribute to an undesirable build up of heat in the optical system. The build up of heat may adversely affect the performance of the optical system.

Optical wavelength converters are often sealed to protect them against environmental contamination. This can complicate removal of heat by conventional methods such as conduction or convection.

It is within this context that embodiments of the present invention arise.

BRIEF DESCRIPTION OF THE DRAWINGS

Other objects and advantages of the invention will become apparent upon reading the following detailed description and upon reference to the accompanying drawings in which.

DESCRIPTION OF THE SPECIFIC EMBODIMENTS

Figure 1:
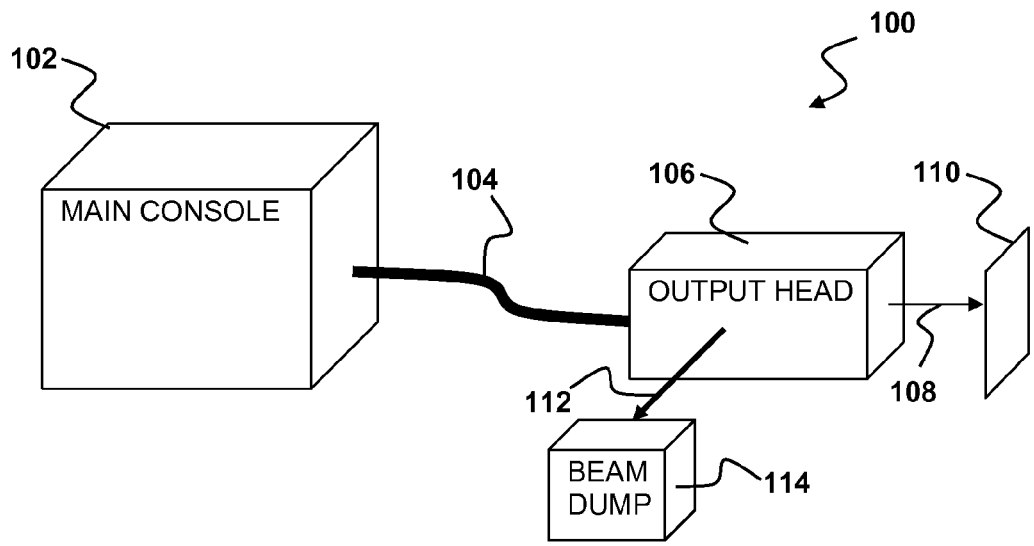
FIG. 1 is an isometric drawing of an optical system according to an embodiment of the present invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

GLOSSARY

As used herein:

The indefinite article "A", or "An" refers to a quantity of one or more of the item following the article, except where expressly stated otherwise.

Beam splitter refers to an optical device capable of splitting a beam of light into two or more parts.

Brillouin scattering refers to a nonlinear optical phenomenon involving spontaneous scattering of light in a medium due to interaction between the light and sound waves passing through the medium.

Cavity or Optically Resonant Cavity refers to an optical path defined by two or more reflecting surfaces along which light can reciprocate or circulate. Objects that intersect the optical path are said to be within the cavity.

Chirping refers to a rapid change, as opposed to a long-term drift, in the emission wavelength of an optical source.

Continuous wave (CW) laser refers to a laser that emits radiation continuously rather than in short bursts, as in a pulsed laser.

Duty Cycle (D) refers to the product of the pulse duration $\tau$ and the pulse repetition frequency (PRF) for pulses that occur at regular intervals. The duty cycle may be expressed as a ratio, for example, 0.01 or equivalently may be expressed as a percentage, for example 1%.

Diode Laser refers to a light-emitting diode designed to use stimulated emission to generate a coherent light output. Diode lasers are also known as laser diodes or semiconductor lasers.

Diode-Pumped Laser refers to a laser having a gain medium that is pumped by a diode laser.

Gain refers to an increase in intensity, power, or pulse energy of a signal that is transmitted from one point to another through a medium.

Gain Medium refers to a lasable material as described below with respect to a Laser.

Garnet refers to a particular class of oxide crystals, including e.g., yttrium aluminum garnet (YAG), gadolinium gallium garnet (GGG), gadolinium scandium gallium garnet (GSGG), yttrium scandium gallium garnet (YSGG) and similar.

Includes, including, e.g., "such as", "for example", etc., "and the like" may, can, could and other similar qualifiers used in conjunction with an item or list of items in a particular category means that the category contains the item or items listed but is not limited to those items.

Infrared Radiation refers to electromagnetic radiation characterized by a vacuum wavelength between about 700 nanometers (nm) and about 100,000 nm.

Laser is an acronym of light amplification by stimulated emission of radiation. A laser is a cavity that is contains a lasable material. This is any material—crystal, glass, liquid, semiconductor, dye or gas—the atoms of which are capable of being excited to a metastable state by pumping e.g., by light or an electric discharge. Light is emitted from the metastable state by an atom as it drops back to the ground state. The light emission is stimulated by the presence by a passing photon, which causes the emitted photon to have the same phase and direction as the stimulating photon. The light (referred to herein as stimulated radiation) oscillates within the cavity, with a fraction ejected from the cavity to form an output beam.

Light: As used herein, the term "light" generally refers to electromagnetic radiation in a range of frequencies running from infrared through the ultraviolet, roughly corresponding to a range of vacuum wavelengths from about 1 nanometer ($10^{-9}$ meters) to about 100 microns.

Mode-Locked Laser refers to a laser that functions by controlling the relative phase (sometimes through modulation with respect to time) of each mode internally to give rise selectively to energy bursts of high peak power and short duration, e.g., in the picosecond ($10^{-12}$ second) domain.

Nonlinear effect refers to a class of optical phenomena that can typically be viewed only with nearly monochromatic, directional beams of light, such as those produced by a laser. Higher harmonic generation (e.g., second-, third-, and fourth-harmonic generation), optical parametric oscillation, sum-frequency generation, difference-frequency generation, optical parametric amplification, and the stimulated Raman Effect are examples of non-linear effects.

Nonlinear Optical Wavelength Conversion Processes are non-linear optical processes whereby input light of a given vacuum wavelength $\lambda_0$ passing through a non-linear medium interacts with the medium and/or other light passing through the medium in a way that produces output light having a different vacuum wavelength than the input light. Nonlinear wavelength conversion is equivalent to nonlinear frequency conversion, since the two values are related by the vacuum speed of light. Both terms may be used interchangeably. Nonlinear Optical Wavelength conversion includes:

Higher Harmonic Generation (HHG), e.g., second harmonic generation (SHG), third harmonic generation (THG), fourth harmonic generation (FHG), etc., wherein two or more photons of input light interact in a way that produces an output light photon having a frequency $Nf_0$, where N is the number of photons that interact. For example, in SHG, N=2.

Sum Frequency Generation (SFG), wherein an input light photon of frequency $f_1$ interacts with another input light photon of frequency $f_2$ in a way that produces an output light photon having a frequency $f_1+f_2$.

Difference Frequency Generation (DFG), wherein an input light photon of frequency $f_1$ interacts with another input light photon of frequency $f_2$ in a way that produces an output light photon having a frequency $f_1-f_2$.

Nonlinear Material refers to materials that possess a non-zero nonlinear dielectric response to optical radiation that can give rise to non-linear effects. Examples of non-linear materials include crystals of lithium niobate ($LiNbO_3$), lithium triborate (LBO), beta-barium borate (BBO), Cesium Lithium Borate (CLBO), KDP and its isomorphs, $LiIO_3$, as well as quasi-phase-matched materials, e.g., PPLN, PPSLT, PPKTP and the like. Optical fiber can also be induced to have a non-linear response to optical radiation by fabricating microstructures in the fiber.

Optical Amplifier refers to an apparatus that amplifies the power of an input optical signal. An optical amplifier is similar to a laser in that it uses a gain medium driven by pumping radiation. The amplifier generally lacks feedback (i.e. a cavity), so that it has gain but does not oscillate. As used herein an optical power amplifier generally refers to the last optical amplifier before delivery of an amplified beam to a target or a wavelength converter. An amplifier stage between a source of radiation and a power amplifier is generally referred to herein as a preamplifier.

Phase-Matching refers to the technique used in a multi-wave nonlinear optical process to enhance the distance over which the coherent transfer of energy between the waves is possible. For example, a three-wave process is said to be phase-matched when $k_1+k_2=k_3$, where $k_i$ is the wave vector of the $i^{th}$ wave participating in the process. In frequency doubling, e.g., the process is most efficient when the fundamental and the second harmonic phase velocities are matched. Typically the phase-matching condition is achieved by careful selection of the optical wavelength, polarization state, and propagation direction in the non-linear material.

Pulse Duration ($\tau$) refers to the temporal duration or lifetime of a repetitive signal, e.g., the time interval between the half-power points on the leading and trailing edges of the pulse. Pulse duration is sometimes referred to as "pulse width".

Pulse Energy refers to the amount of energy in a pulse. Pulse energy may be calculated by integrating instantaneous pulse power over the pulse period.

Pulse Period (T) refers to the time between equivalent points of successive pulses in a train of two or more pulses.

Pulse Repetition Frequency (PRF) refers to the rate of repetition of pulses per unit time. The PRF is inversely related to the period T, e.g., PRF=1/T.

Q refers to the figure of merit of a resonator (cavity), defined as ($2\pi$)×(average energy stored in the resonator)/(energy dissipated per cycle). The higher the reflectivity of the surfaces of an optical resonator and the lower the absorption losses, the higher the Q and the less energy loss from the desired mode.

Q-switch refers to a device used to rapidly change the Q of an optical resonator.

Q-switched Laser refers to a laser that uses a Q-switch in the laser cavity to prevent lasing action until a high level of inversion (optical gain and energy storage) is achieved in the lasing medium. When the switch rapidly increases the Q of the cavity, e.g., with acousto-optic or electro-optic modulators or saturable absorbers, a giant pulse is generated.

Quasi-CW refers to generating a succession of pulses at a high enough repetition rate to appear continuous.

Quasi Phase-matched (QPM) Material: In a quasi-phase-matched material, the fundamental and higher harmonic radiation are phase-matched by periodically changing the sign of the material's non-linear coefficient. The period of the sign change ($k_{QPM}$) adds an additional term to the phase matching equation such that $k_{QPM}+k_1+k_2=k_3$. In a QPM material, the fundamental and higher harmonic can have identical polarizations, often improving efficiency. Examples of quasi-phase-matched materials include periodically-poled lithium tantalate (PPLT), periodically-poled lithium niobate (PPLN), periodically poled stoichiometric lithium tantalate (PPSLT), periodically poled potassium titanyl phosphate (PPKTP) or periodically poled microstructured glass fiber.

Raman Scattering refers to a scattering of incident light by matter in which the scattered light has a lower frequency than the incident light. The difference between the frequencies of the incident and scattered light (referred to as the Raman shift) corresponds to a natural vibrational frequency of the scattering material.

Saturation of an optical amplifier refers to a decrease of the gain coefficient of a medium near some transition frequency when the power of the incident radiation near that frequency exceeds a certain value. If the gain coefficient is constant, the power emitted by the medium is proportional to the incident power. However, there is typically a limit to the rate at which a gain medium can emit power. This limit depends on the lifetimes of the energy levels involved. As this limit is reached, the stimulated transitions become rapid enough to significantly lower the upper energy level population, thereby decreasing the gain coefficient. The effect is to "flatten" the amplified power as a function of input power.

Stimulated Brillouin Scattering (SBS) refers to a type of amplification process in which intense light causes deformation of a crystal lattice that generates ultrasonic waves in the lattice. The Brillouin-scattered light experiences gain and its power increases exponentially. If the power of the incident light exceeds a threshold value, a large portion of the incident light is converted to Brillouin-scattered light having a lower frequency than the incident light.

Stimulated Raman Scattering (SRS) is a type of Raman scattering that can occur with an intense optical beam. The Raman-scattered light experiences gain and its power increases exponentially. If the power of the incident light exceeds a threshold value, a large portion of the incident light is converted to Raman-scattered light having a lower frequency than the incident light. SRS is also sometimes known as the stimulated Raman effect or coherent Raman effect.

Thermal Isolation refers to a situation where heat flow between to objects or locations is sufficiently inhibited in some way. As used herein, two objects or locations are said to be thermally isolated when heat flow between them is inhibited to the point that certain detrimental effects of such heat flow do not arise over some time frame of interest.

Ultraviolet (UV) Radiation refers to electromagnetic radiation characterized by a vacuum wavelength shorter than that of the visible region, but longer than that of soft X-rays.

Ultraviolet radiation may be subdivided into the following wavelength ranges: near UV, from about 380 nm to about 200 nm; far or vacuum UV (FUV or VUV), from about 200 nm to about 10 nm; and extreme UV (EUV or XUV), from about 1 nm to about 31 nm.

Vacuum Wavelength: The wavelength of electromagnetic radiation is generally a function of the medium in which the wave travels. The vacuum wavelength is the wavelength electromagnetic radiation of a given frequency would have if the radiation were propagating through a vacuum and is given by the speed of light in vacuum divided by the frequency.

Saturation Intensity ($I_{sat}$): The intensity which reduces the gain of an amplifier to half of its small-signal value. An amplifier is said to be saturated if the signal intensity passing through the amplifier is significantly larger than the saturation intensity.

Waste Light refers to light that does not contribute to a desired output beam.

DESCRIPTION

In embodiments of the present invention, waste light in an optical head is captured and directed toward a suitable beam dump that is thermally isolated from heat sensitive components of the optical head. The beam dump may be located external to the output head.

The captured waste light may be delivered to the beam dump by a large diameter multimode fiber. By deflecting the waste light to a thermally isolated beam dump, thermal loads on the optical head may be significantly reduced. The return line fiber (sometimes referred to herein as a waste light fiber) transports the waste light to a location remote (e.g., thermally isolated) from where unwanted light is generated. Typically the waste light is transported to a location remote from the optical head. Unwanted light may be absorbed along the length of the waste light fiber, directed to a beam dump in a main console, or directed to another location where heat is dissipated.

There are a number of different methods to couple waste light into a fiber. For example, the waste light may be directly coupled into the fiber. Such coupling is appropriate, e.g., if the beam diameter of the waste light is smaller than the diameter of the fiber. Alternatively, coupling with an appropriate lens may be used. For example, a converging lens may be appropriate if the beam diameter of the waste light is larger than the fiber diameter. A diverging lens may be appropriate if the beam diameter is smaller than the fiber diameter. The use of a diverging lens may also reduce the fluence level of the waste light on the fiber end face to avoid damage. In some situations, a tapered fiber may be used to couple waste light to the fiber. The tapered fiber may be either a converging or diverging taper. Tapered fibers may be used in a manner similar to fiber coupling with a lens.

FIG. 1 schematically illustrates a typical optical system 100 illustrating the concept behind embodiments of the present invention. The optical system 100 includes a main console 102 that is optically coupled by an umbilical 104 to an output head 106.

The main console 102 may include several components used in the generation of primary light that is used by the output head 106. Such components may include a source of seed radiation, one or more pre-amplifiers, a power amplifier, sources of pumping radiation (e.g., laser diodes) for the power amplifier, a system controller and one or more heat sinks. Other possible components for the main console 102 include a chiller or heat exchanger to remove excess heat from heat sinks in the main console.

The umbilical 104 may provide a path for optical coupling between the main console 102 and the output head 106. The umbilical 104 may be permanently affixed at one end or connectorized on both ends. By way of example, the umbilical 104 may include one or more optical fibers. Alternatively, the one or more optical fibers may be contained in multiple umbilical connections between the main console 102 and the output head 106. The optical fibers may couple primary light from sources and/or amplifiers in the main console 102 to components within the output head that use the primary light. The optical fibers may alternatively carry pumping radiation from the main console to one or more optical amplifiers located in the output head 106. In addition, the umbilical 104 may include cables or wires that conduct electrical signals between electronic components in the main console 102 and electronic components in the output head 106.

The output head produces an output beam 108 that is directed towards a target 110. Waste light 112 may also be produced in the optical head 106. The waste light 112 is directed to a beam dump 114 that captures the waste light 112. The beam dump 114 is thermally isolated from the location within the optical head 106 where the waste light 112 is captured. By capturing the waste light 112 and removing it to a location that is sufficiently thermally isolated from the point of capture, a potential source of heat may be removed from the output head 106. Such a configuration may avoid thermal management problems in high power optical systems. As used herein the term "sufficiently thermally isolated" generally means that greater than about 90 percent of the heat generated by the waste light 112 is not coupled back into the output head 106 or that part of the output head 106 where the waste light was captured.

There are a number of possible locations and configurations for the beam dump 114. For example, the beam dump 114 may be located separate from the output head 106. Alternatively, the beam dump 114 may be part of the output head 106, but is sufficiently thermally isolated from the bulk of output head 106 or thermally sensitive components in the output head 106. In either case beam dump 114 is thermally isolated from the place where the waste light 112 is captured. The waste light 112 may be coupled to the beam dump 114 through a light conduit, such as an optical fiber or waveguide. In addition, the beam dump 114 may be located at the main console 102. In such a case the umbilical 104 may include an optical path, e.g., one or more optical fibers) to couple waste light 112 to the beam dump 114.

By way of example, the beam dump 114 may include a tortuous, e.g., serpentine, optical path that allows for multiple locations providing glancing reflection and absorption of the waste light 112. Alternatively, the beam dump 114 may be a simple block of sufficiently heat resistant and optically absorptive material, e.g., graphite, brick, cinder block, metal, or ceramic. Beam dump 114 may be coated to improve its optical absorption properties, e.g. black anodized aluminum. It is desirable for the beam dump 114 to have sufficient thermal mass and heat removal capacity that its temperature does not rise to an undesirable level as a result of absorption of the waste light 112. It is also desirable that beam dump 114 scatter or reflect backwards a minimal amount of waste light to prevent deleterious effects from optical feedback. The beam dump 114 may be coupled to a suitable heat sink and/or chiller and/or heat exchanger to minimize the temperature increase experienced by beam dump. Such components may be located in the main console 102. Alternatively, the beam dump 114 may include a length of optically absorbing fiber.

The beam dump 114 may be thermally isolated in any of a number of ways. For example the beam dump may be separated from heat-sensitive components by a sufficient distance that heat transfer from the beam dump 114 is not detrimental. Alternatively, a thermally insulating material may be disposed between the beam dump 114 and heat-sensitive components.

Figure 2:
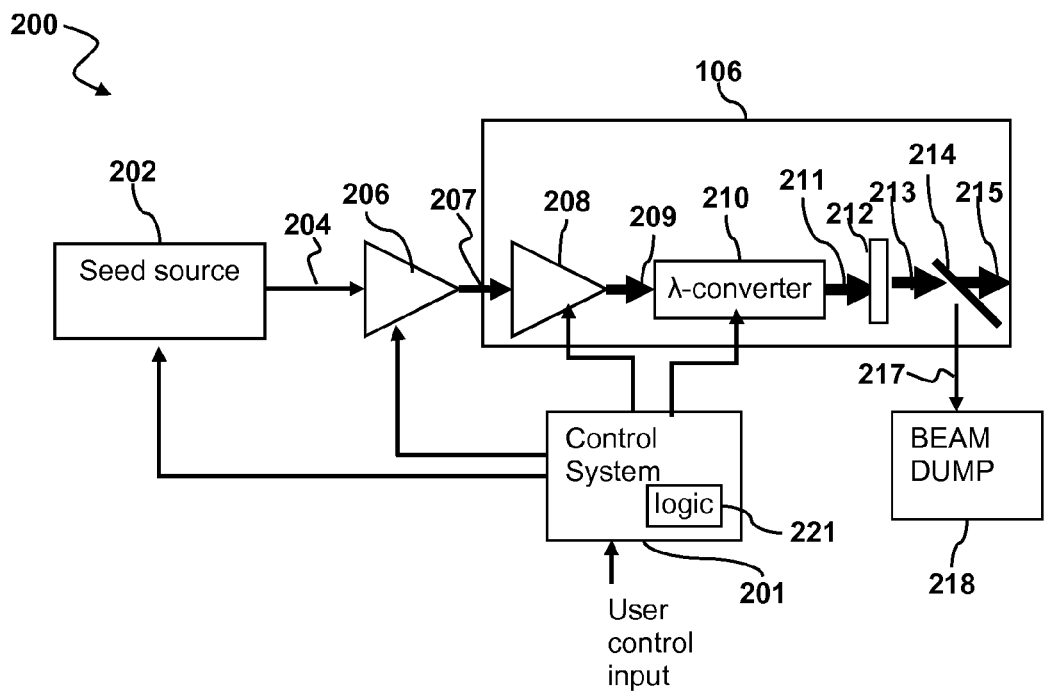
FIG. 2 is a schematic diagram of a wavelength-converted optical system according to an embodiment of the present invention.

Embodiments of the invention may be used in optically amplified, wavelength-converted optical systems. For example, FIG. 2 depicts an optically amplified and wavelength-converted optical system 200 according to an embodiment of the present invention. The optical system 200 generally includes a seed source 202, a pre-amplifier 206, a power amplifier 208, an optical wavelength converter 210, coupling optics 212 and a pick-off element 214. The system 200 may optionally include a controller 201 operably coupled to the seed source 202 and/or pre-amplifier 206 and/or power amplifier 208 and/or wavelength converter 210.

The seed source 202 generates seed radiation 204, which is amplified by the amplifier 206 to produce a pre-amplified output 207. The power amplifier 208 amplifies the pre-amplified output 207 producing an amplified output 209. The wavelength converter 210 wavelength converts at least a portion of the amplified output 209 to produce a wavelength converter output 211. The wavelength-converted output 211 may be characterized by vacuum wavelengths in the infrared (IR), visible, or ultraviolet (UV) ranges of the electromagnetic spectrum depending on the optical spectrum of the amplified output 209 and the nature of the wavelength conversion taking place in the wavelength converter 210. The optical wavelength converter 210 may produce the wavelength-converted output 211 characterized by an optical frequency $\omega_2$ from the amplified output 209 by one or more non-linear optical wavelength conversion processes. Examples of such process include, but are not limited to, e.g., second-, third-, and fourth-harmonic generation, higher harmonic generation, optical parametric oscillation, sum frequency generation, difference frequency generation, optical parametric amplification, optical parametric oscillation and the stimulated Raman effect. Such processes may be implemented using non-linear optical materials that are phase matched to produce the desired wavelength conversion effect. It is noted that although optical amplifier 208 and wavelength converter 210 are shown as separate components, this is not meant to preclude the possibility that the amplification and wavelength conversion functions may be implemented in a single component.

The wavelength converter 210 may produce the wavelength converted output 211 through one or more non-linear processes. Any non-linear process may be implemented. By way of example, the non-linear process may be a $\chi^2$ nonlinear interaction or $\chi^3$ process. Examples of $\chi^2$ nonlinear interactions include second harmonic generation, third harmonic generation, fourth harmonic generation, optical parametric oscillation, and generation of sum or difference frequencies between frequencies of the seed pulses and/or one or more harmonics.

Combinations of two or more such processes may also take place in the wavelength converter 211. Examples of $\chi^3$ process include Raman scattering, Brillouin scattering, and self-phase modulation.

The wavelength converter 210 may be part of an optical output head 106 that is remotely located from the other components of the system 200 and connected to them by an optical fiber. The coupling optics 212 may receive the wavelength-converted output 211 from the wavelength converter 210 and transmit a final output 213. The coupling optics 212 may include simple windows and may also include an optical fiber. Alternatively, the coupling optics 212 may include lenses having focal lengths and positions selected to collimate or focus the wavelength converter output 211 as a final output 213. The coupling optics 212 may alternatively be configured to modify the temporal characteristics of the final output 213.

The wavelength converter output 211 and final output 213 may include useful wavelength converted light and waste light 217 that is not intended to be delivered to the ultimate target of the final output 213. The waste light 217 may be in the form of unconverted amplified output 209 or radiation left over from an intermediate stage of the wavelength conversion process taking place in the wavelength converter 210. For example, the wavelength converter 210 may be a third-harmonic generator that converts amplified output 209 of wavelength $\lambda_0$ to third harmonic light of wavelength $\lambda_0/3$. An intermediate stage of this wavelength conversion process may produce second harmonic radiation of wavelength $\lambda_0/2$, which is subsequently converted to third harmonic radiation. The waste light in the wavelength converted output 211 and/or final output 213 may include both unconverted fundamental radiation and unconverted second harmonic radiation. Generally it is desirable to remove all or a substantial portion of this waste light from delivered beam 215. However, diversion of the waste light into free space may present a hazard, particularly if the final output 213 has a high average power, e.g., greater than about 0.5 Watts. Consequently the pick-off optical element 214, e.g., a dichroic mirror, used to divert the waste light may be located within the output head 106. The waste light may be diverted to a thermally isolated beam dump 218 that is located in the output head 106 or connected to the pick-off optical element 214 via a light conduit, such as an optical fiber or waveguide.

The delivered radiation 215 may be delivered to any of a number of different types of targets to implement any of a number of different types of processes depending on the application. Applications include, but are not limited to, material processing, medical treatments, laser particle accelerators, and wafer inspection. Examples of suitable targets include, but are not limited to, metals, ceramics, semiconductors, polymers, composites, thin films, organic materials, in vitro or in vivo biological samples, and elementary particles. In the particular case of material processing, targets may include, e.g., wires, printed circuit (PC) boards, integrated circuit (IC) packages, IC wafers dies, LED wafers, packages, dies and the like. Examples of material processing applications include surface texturing, heat treatment, surface engraving, fine micro-machining, surface ablation, cutting, grooving, bump forming, coating, soldering, brazing, sintering, sealing, welding, link blowing, wafer scribing, dicing and marking, via drilling, memory repair, flat panel display repair, stereolithography, maskless lithography, surface diffusion and surface conversion to a compound.

Embodiments of the present invention are not limited to a particular type of seed source 202, pre-amplifier 206, power amplifier 208 or wavelength converter 210. However, examples of these components are described below for the purpose of illustration.

The seed source 202 may generate the seed radiation 204 in the form of one or more seed pulses. The seed radiation 204 has an optical spectrum, e.g., a continuous distribution of wavelengths which may be centered on some fundamental wavelength $\lambda_0$ and characterized by a bandwidth $\Delta\lambda$. Alternatively the spectrum of the seed radiation 204 may be a distribution of discrete wavelengths each with its characteristic bandwidth. The spectral distribution may be substantially constant over the duration of a pulse, or may vary with time, e.g., may be chirped. Generally, the seed source 202 may include a laser and seed radiation 204 may be in the form of coherent light. Alternatively, seed source 202 may include an amplified spontaneous emission (ASE) source. The seed radiation 204 produced by the seed source 202 may be in the IR, visible, or UV ranges of the electromagnetic spectrum. For example, the seed radiation 204 may be characterized by a vacuum wavelength in a range from about 500 nm to about 2000 nm. Optical signals having wavelengths within this range may be obtained with a variety of different lasers, such as semiconductor lasers and fiber lasers.

There are a number of different possible designs for the seed source 202. For example, the seed source 202 may be a low power diode laser pumped by driving electric current through the diode. An example of a suitable commercially available, DBR type laser diode is a model DBR-1064-100 from Sacher Lasertechnik Group of Marburg, Germany. The seed radiation 204 may be pulsed by turning the current on and off. Alternatively, the seed radiation 204 may be pulsed by an optical modulator, such as an acousto-optic or electro-optic modulator. A particularly useful type of modulator is an integrated optic type Mach-Zender modulator fabricated on lithium niobate. An example of such a modulator is a commercially available Model #MXPE-LN from Photline Inc. of Besancon, France. In addition, the seed radiation 204 may be chirped to avoid stimulated Brillouin scattering (SBS) in the pre-amplifier 206 and/or power amplifier 208. For a DBR type laser diode, chirping is achieved by slewing the voltage or current through either the gain, phase, or reflector sections of the laser diode. The chirp rate may be as low as about 10 MHz/ns to greater than about 1 GHz/ns depending on the system. The chirp rate may be tuned to avoid SBS in the pre-amplifier 206 and/or power amplifier 208.

Figure 3:
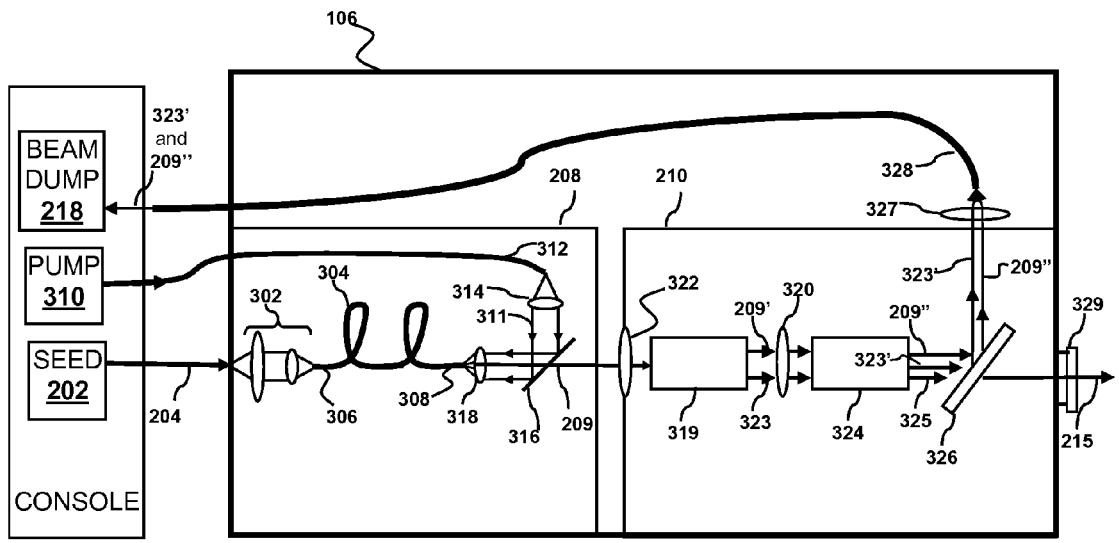
FIG. 3 is a schematic diagram of a wavelength-converted optical system according to an alternative embodiment of the present invention.

As discussed above, the power amplifier 208 and wavelength converter 210 may be part of the optical output head 106. FIG. 3 schematically depicts one possible configuration of the output head 106 according to an embodiment of the present invention. In this embodiment, the optical head 106 may include the power amplifier 208 and the wavelength converter 210. The power amplifier 208 may include input coupling optics 302 and an amplifier fiber 304 having a first end 306 and a second end 308. Seed radiation 204 (or alternatively, pre-amplified radiation 207) may be coupled to the optical head 106.

In the example depicted in FIG. 3 the power amplifier 208 is a fiber power amplifier. An optical coupler 302, e.g., having a pair of relay lenses, may couple the seed radiation 204 into an optical fiber 304 at a first end 306. Preferably, the fiber 304 is long enough that it absorbs a sufficient percentage of the pumping radiation (e.g., about 90% or more). Any pump light 311 that is not absorbed in fiber 304 is a form of waste light that may be captured and directed to a thermally isolated beam dump. It is desirable for the fiber 304 to have a core diameter suitable for a large mode area (LMA) fiber. It is further desirable that fiber 304 be dual clad, with an inner cladding diameter and acceptance angle suitable for accepting high-power, multi-mode pump radiation. It is also desirable that fiber 304 be a polarization maintaining or single polarization fiber. By way of example, the fiber 304 may be a Nufern Dual Clad Active fiber with LMA core, e.g., part numbers LMA-EYDF-25/300 or LMA-TDF-25/250 available from Nufern of East Granby, Conn. or a Model DC-200-41-PZ-Yb available from Crystal Fibre A/S of Birkerod, Denmark. By way of example, the core of the fiber 304 may be doped with a rare earth element, such as erbium (Er), ytterbium (Yb) or neodymium (Nd).

In the example depicted in FIG. 3, a remotely located pumping source 310 supplies pumping radiation 311 to the fiber 304 at a second end 308. In some embodiments, the pumping source 310 may be a component of the main console 102. In some embodiments it may be advantageous to situate the pumping source 310 in the main console 102, and connect the pumping source 310 to the output head 106 via a fiber 312. The fiber 312 may be part of the umbilical 104. Such an arrangement may reduce the size of the output head 106 and the heat load generated in the output head.

The pumping source 310 may contain one or more high power laser diodes. These laser diodes can be either in the form of a single-emitter or a monolithic bar, containing multiple single emitters. Specific examples of suitable commercially available laser diodes include a model LIMO 110-F400-DL980 laser diode, from Lissotschenko Mikrooptik (LIMO) GmBH of Dortmund, Germany and an Apollo F400-980-4 laser diode from Apollo Instruments of Irvine, Calif. Alternatively, the pumping source 310 may be an array of single emitters optically coupled together, for example an array of model L3 980 nm pump package available from JDS Uniphase of Milpitas, Calif.

Preferably, the pumping source 310 is a multimode source and the amplifier fiber 304 has a multi-mode inner cladding. In the power amplifier 208, the pumping radiation 311 is typically coupled to the inner cladding of the fiber 304. If the pumping radiation 311 is single-mode, then the pumping radiation 311 may alternatively be coupled directly to the core of the fiber 304. By way of example, the fiber 312 may couple the pumping radiation 311 from the pumping source 310 to the second end 308 of the amplifier fiber 304 via a collimator lens 314. The pumping radiation 311 may be coupled to either end of the fiber 304 or to both ends.

The pumping radiation 311 typically emerges from the fiber 312 as a divergent beam. The collimator lens 314 focuses the divergent beam into a collimated beam. A wavelength-selective reflector 316 (e.g., a dichroic filter) reflects the pumping radiation toward a converging lens 318, which focuses the collimated pumping radiation into the second end 308 of the fiber 304. Any pump light 311 that leaks through wavelength-selective reflector 316 is a form of waste light that may be captured and directed to a thermally isolated beam dump. Dopant atoms in the core of the fiber 304 absorb some portion of the pumping radiation 311 stimulating emission of amplified output radiation 209 having the same frequency and phase as the seed radiation 204 (or pre-amplified radiation 207), but with an amplified optical intensity. The wavelength-selective reflector 316 is configured to transmit the amplified output radiation 209. By way of example, the frequency selective filter 316 may be a dichroic filter having a stop band selected to reflect radiation in the frequency range of the pumping radiation 311 (e.g., about 976 nanometers) and a passband selected to transmit radiation in the frequency range of the amplified output radiation 209 (e.g., about 1.06 microns).

By way of example and without limitation, the amplified output radiation 209 may be pulsed. Such pulses may be characterized by a pulse duration of about 10 nanoseconds and a pulse repetition frequency (PRF) of about 100 KHz. The amplified output radiation 209 may have an average power of about 30 Watts. The pumping radiation may have an average power of about 40 watts. The amplified output radiation 209 may be characterized by a vacuum wavelength of about 1064 nm.

Although the preceding discussion details fiber amplifiers that may be used as pre-amplifiers or power amplifiers, other optical amplifier designs may be used. As an alternative to fiber implementations, the amplifier 208 may use a slab-type gain medium, e.g., a doped crystal such as neodymium-doped yttrium orthovanadate (Nd:YVO$_4$), neodymium-doped yttrium aluminum garnet (Nd:YAG), or a ceramic gain medium such as sintered Nd:YAG or a semiconductor-based gain medium. Such slab-type gain media may be side-pumped or end-pumped. Gain media with rod-type configurations may also be used in the amplifier 208.

The amplified output 209 from the optical amplifier 208 is optically coupled to the wavelength converter 210. In some embodiments of the invention, the output head 106 may include coupling optics 322 that receive the amplified output 209 from the optical amplifier 208 and transmit it to the wavelength converter 210. The coupling optics 322 may alternatively be in the form of simple windows. Alternatively, the coupling optics may include one or more lenses having focal lengths and positions selected to collimate or focus the amplified output 209 into the wavelength converter 210. The coupling optics 322 may alternatively be configured to modify the temporal characteristics of the amplified output 209. In some embodiments, the coupling optics may include pulse-compression (or stretcher) schemes. This type of coupling optics may be particularly useful with picosecond or femtosecond type pulsed outputs to avoid undesired optical nonlinearities. Alternatively, the coupling optics 322 may include some means to affect the amplified output 209, e.g., its pulse repetition frequency (PRF). For example, the coupling optics 322 may include an optical shutter that allows a user to selectively block all or some of amplified output 209. Alternatively, the coupling optics 322 may include a pulse picker to reduce the PRF of the amplified output 209. In such a case, the rejected waste light from the pulse picker could advantageously be captured as a form of waste light and directed to a thermally isolated beam dump.

Embodiments of the present invention may use any suitable wavelength converter. By way of example the wavelength converter 210 depicted in FIG. 3 may be a third-harmonic generator. In such a case, the wavelength converter 210 may generally include first and second non-linear crystals 319, 324. Examples of suitable non-linear crystals of include lithium niobate (LiNbO$_3$), lithium triborate (LBO), beta-barium borate (BBO), cesium lithium borate (CLBO), lithium tantalate, stoichiometric lithium tantalite (SLT) potassium titanyl phosphate (KTiOPO$_4$ also known as KTP), ADA, ADP, CBO, DADA, DADP, DKDP, DLAP, DRDP, KABO, KDA, KDP, LB4, or LFM and isomorphs thereof, periodically poled materials such as periodically poled lithium niobate (PPLN), periodically poled lithium tantalate and periodically poled stoichiometric lithium tantalate (PPSLT). Such non-linear materials are available commercially, e.g., from Fujian Castech Crystals of Fujian, China. In addition, nonlinear fiber may be used for wavelength conversion. The wavelength converter 210 may be operably connected to the controller 201. By way of example, logic 221 in controller 201 may control devices that adjust temperature, strain, position, angular orientation or electric field in one or both of the of first and second non-linear crystals, 319 and 324, to maximize, control, and/or stabilize or otherwise adjust the wavelength conversion efficiency.

The first non-linear crystal 319 receives the amplified output radiation 209 from the amplifier 208. The amplified output radiation 209 may be characterized by an optical frequency $\omega$. The first non-linear crystal 319 may be phase-matched for second harmonic generation. Phase-matching may be controlled by adjusting a temperature of the first non-linear crystal 319. Specifically, a portion of the amplified output radiation 209 reacts in the first non-linear crystal 319 to produce second-harmonic radiation 323, which is characterized by an optical frequency $2\omega$. The second-harmonic radiation 323 and a remaining portion 209' of the amplified output radiation 209 are coupled to the second non-linear crystal 324. The second non-linear crystal 324 may be phase-matched for sum frequency generation between radiation of optical frequency $2\omega$ and radiation of optical frequency $\omega$. Specifically, in the second non-linear crystal 324, the second harmonic radiation 323 and the remaining portion 209' of the amplified output radiation 209 interact in the second non-linear crystal 324 to produce third-harmonic radiation 325 characterized by an optical frequency $3\omega$. The third harmonic radiation 325 may exit the second non-linear crystal 324 to provide a wavelength-converted output.

By way of example, the first crystal 319 may double the frequency of 1.04 micron to 1.08 micron wavelength amplified output radiation 209 to produce second harmonic radiation 323 having a vacuum wavelength of about 520 nm to about 540 nm. The second non-linear crystal 324 may then sum the second harmonic radiation 323 with the remaining portion 209' of the amplified output radiation 209 to produce third harmonic radiation 325 having a vacuum wavelength ranging from about 340 nm to about 360 nm. By way of example, and without loss of generality, the first crystal 319 may double 1.064-micron amplified output radiation 209 to generate 532 nm second-harmonic radiation 323. The second crystal may then sum the remaining portion 209' of the amplified output radiation 209 with the second-harmonic radiation 323 to produce 355 nm third-harmonic radiation 325.

If the conversion efficiencies of the non-linear crystals 319, 324 are less than 100% some left-over portion 209" of the amplified output radiation 209 may also exit the second non-linear crystal 324. In addition, some leftover portion of the second harmonic radiation 323' may also exit the second non-linear crystal 324. Both the leftover amplified output radiation 209" and the leftover second harmonic radiation 323' may be examples of waste light. The wavelength converter 210 may include as the pick-off element 214 an optical filter 326 (e.g., a dichroic filter) that reflects the left-over portion 209" of the amplified output radiation 209 and the left-over portion 323' of the second-harmonic radiation 323 while transmitting the third harmonic radiation 325. Alternatively, the pick-off element 214 could reflect the third harmonic radiation 325 and transmit the left-over portions 209" and 323'. In some cases the beams 209", 323', and 325 emerging from non-linear crystal 324 may be spatially or angularly separated due to walk-off in the crystal. In this case pick-off element 214 need not be a dichroic filter, but could simply be an optical element which captures only the waste light (e.g., left-over portions 209" and/or 323') and directs them to a thermally isolated beam dump. The third harmonic radiation 325 may then exit the output head 106 through output optics 329 and be coupled to a target as the delivered radiation 215. The left-over portions 209", 323' may be captured in waste light fiber 328 via lens 327 and directed to a beam dump or otherwise disposed of as waste light. The waste light fiber 328 may be a multimode fiber. The waste light fiber 328 may be part of the umbilical 104. The waste light fiber may couple the leftover portions 209", 323' to a beam dump located on the main console 102 or at some other location that is thermally isolated from the wavelength converter 210. Waste return fiber 328 may include bulkhead connectors at one or both ends to facilitate optical coupling to either or both the optical head 106 and the main console 102.

The waste light fiber 328 may be a single fiber or a bundle of two or more fibers. For example, the waste light fiber 328 may be a single, large diameter, multimode fiber. Such a fiber may have a core diameter between about 100 microns and about 1 millimeter. Larger core diameter fibers may be used, although they may be too stiff to conveniently bend. Smaller core diameter fibers may also be used, although they may be too difficult to align for effective coupling of the waste light and may be too susceptible to optical damage from the incident and transmitted optical power of the waste light. Alternatively, the waste light fiber 328 may be made from a bundle of smaller core diameter fibers. Individual fibers within such a bundle may have core diameters as small as 10 microns, but the bundle may have an overall diameter of several millimeters. A fiber bundle may be more flexible than an equivalent diameter single fiber.

The waste light fiber 328 may include a core surrounded by a cladding. In some embodiments, the core may be made of a polymer. Such polymer-core fibers are may be most useful in low power systems due to limited power handling capabilities of the polymer fiber core. Alternatively the waste light fiber 328 may include a core made of silica or glass, which may be more suitable for high power operation. The cladding of the waste light fiber 328 may have any suitable configuration. For example, the cladding may have a uniform index of refraction or be stepped or have a graded index. The cladding may be made of any suitable material, e.g., silica (which may be doped), glass or polymer.

Examples of commercially-available single optical fibers that may be used as the waste light fiber 328 include a silica core fiber with a hard polymer cladding such as FT series fiber manufactured by InnovaQuartz of Phoenix, Ariz. or a silica core fiber with a doped silica cladding, such as FG series fiber also manufactured by InnovaQuartz of Phoenix, Ariz. An example of a commercially-available fiber bundle that may be used as the waste light fiber 328 is a Power Light Guide series manufactured by Ceramoptec of Bonn, Germany.

In an alternative embodiment a single fiber may both deliver the pump radiation 311 to the power amplifier 208 and serve as the waste light fiber 328. In such a case, different wavelengths of light traveling in opposite directions may be separated using dichroic beamsplitters on each end. In another alternative embodiment the waste light fiber 328 may be a single fiber having a cladding and multiple cores. Such a configuration allows multiple optical paths between main console 102 and output head 106 to be used simultaneously. Some of these paths could be for waste light, while other paths may supply seed radiation 204, pre-amplified radiation 207, or pump radiation 311 to the output head 106. Alternatively, the waste light could be directed into the inner cladding of a double clad fiber. The core of the fiber may be used to supply seed radiation 204, pre-amplified radiation 207, or pump radiation 311 to the output head 106.

A numerical example related to FIG. 3 may be used to illustrate the advantages of embodiments of the present invention. In a third-harmonic generator of the type depicted in FIG. 3, amplified output radiation 209 at a fundamental frequency ω corresponding to a vacuum wavelength of 1064 nm may be wavelength-converted to the third harmonic frequency 3ω at a conversion efficiency of about 25%. The main heat sources in the optical head 106 may be summarized as follows. The power amplifier 208 may be pumped with about 40 W of power and is about 75% efficient so it produces about 10 Watts of waste heat. In this case, the amplified output radiation 209 has an average power of about 30 Watts and the wavelength-converted output 211 has an average power of about 7.5 watts. This leaves about 22.5 Watts of unconverted amplified output radiation 209" or second harmonic radiation 323'. The total heat load on the optical head 106 would be about 32.5 Watts under such conditions. If the 22.5 Watts of unconverted fundamental radiation 209" and second harmonic radiation are removed via the waste light fiber 328, the heat load on the optical head 106 may be reduced by about 69% (22.5/32.5).

It is noted that although FIG. 3 depicts an example of a third-harmonic generator, those of skill in the art will recognize that other non-linear wavelength converters, such as second-harmonic generators, fourth harmonic generators, other higher harmonic generators, sum-frequency generators, difference-frequency generators, optical parametric oscillators, optical parametric amplifiers, and the like can be used. For example the wavelength converter 210 may be configured as a second harmonic generator if the second non-linear crystal 324 is omitted.

Figure 4:
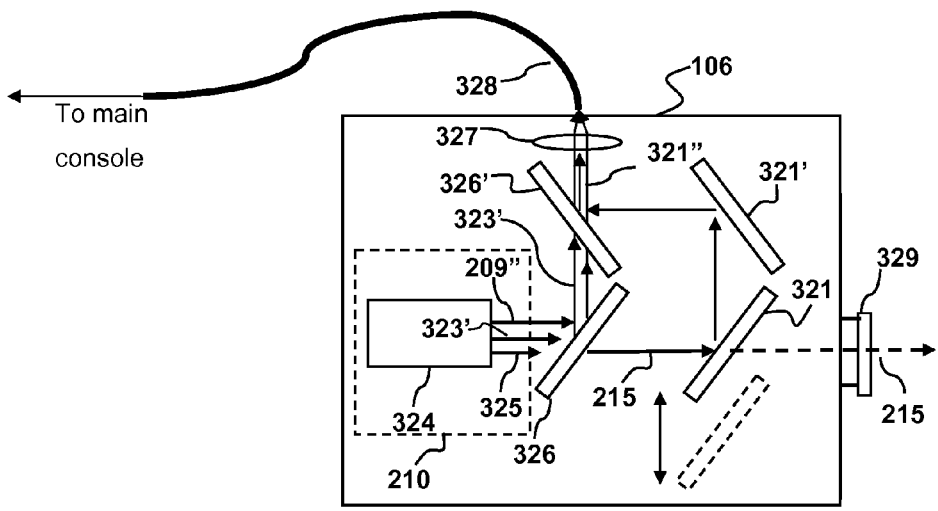
FIG. 4 is a schematic diagram of a portion of an optical head according to an embodiment of the invention.

In embodiments of the present invention, waste light may be collected from a number of different sources in the optical head 106. Waste light from multiple pick-off points may be coupled into a single fiber. For example, a shutter is often used as a safety measure to interrupt the delivered beam 215 immediately prior to exiting the optical head 106. Such a shutter may use a movable mirror to deflect the waste light to the waste light fiber 328. By way of example, FIG. 4 depicts a portion of an optical output head 106 showing unwanted light from multiple sources being directed into a fiber return line 328 according to an alternative embodiment of the invention. In this embodiment, the output head 106 may include optical components, e.g. mirrors 321 that may be selectively positioned to deflect the delivered beam 215 to a target or to the waste light fiber 328.

In the example depicted in FIG. 4, the mirrors 321, 321' include at least variable mirror 321 that may be selectively interposed between the wavelength converter 210 and the output optics 329 to deflect the delivered beam 215 (or a portion thereof) to an optical filter 326' that transmits other waste light components, e.g., leftover amplified output radiation 209" and second harmonic radiation 323, while reflecting a deflected delivered beam 321". By way of example, the variable mirror 321 may be movable between a first position (shown in phantom) and a second position. In the first position, the delivered beam 215 is permitted to pass through to the output optics 329. In the second position, the delivered beam 215 (or a portion thereof) is deflected towards a fixed mirror 321' as the deflected beam 321". The fixed mirror 321' is positioned and oriented to direct the deflected beam 321" towards the optical filter 326'.

In alternative embodiments, waste light may be collected from multiple pick-off points using multiple fibers. For example, instead of directing multiple beams to a common fiber by free space optics, e.g., as shown in FIG. 4, a separate fiber may be used for each unwanted beam. A combiner may be used to combine multiple fibers into a single fiber if desired. In such a case, the final combined fiber preferably has a diameter and angular acceptance large enough to accommodate all the individual waste light fibers.

Figure 5:
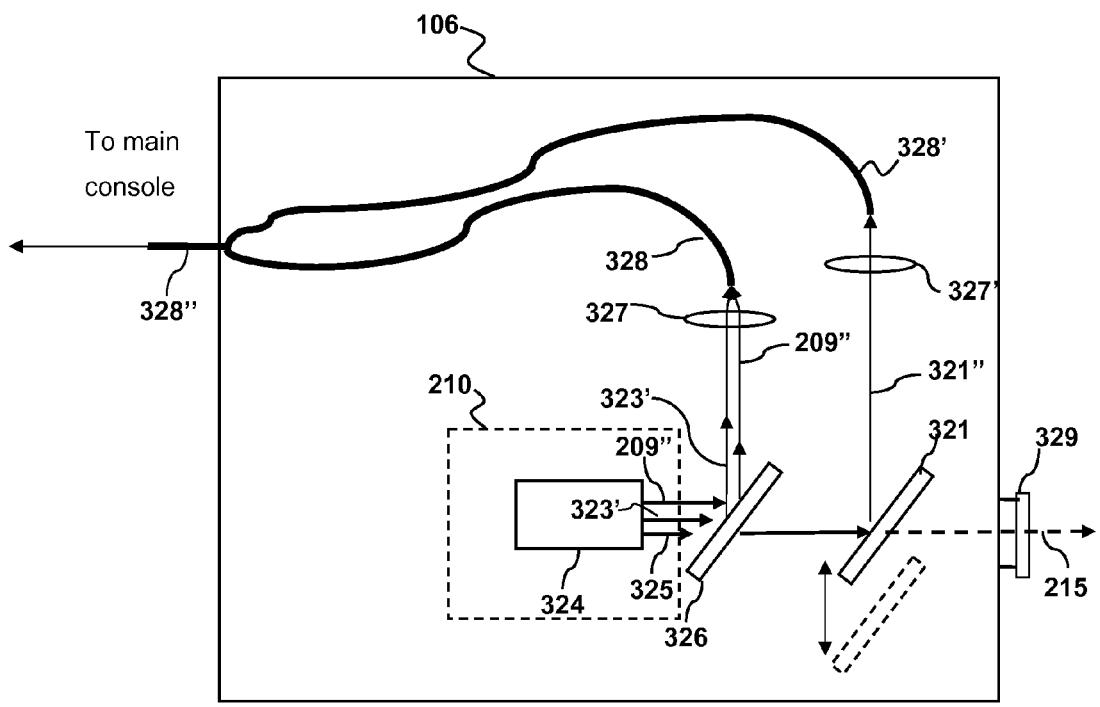
FIG. 5 is a schematic diagram of a portion of an optical head according to an alternative embodiment of the invention.

By way of example, FIG. 5 depicts alternative design for a portion of the optical output head 106 that uses multiple fibers to collect waste light from multiple locations. As in FIG. 3 and FIG. 4, an optical filter 326 deflects waste light, e.g., leftover amplified radiation 209" or second harmonic radiation 323' to a waste light fiber 328 via a lens 327. In this embodiment, the variable mirror 321 may selectively deflect the delivered beam 215, or a portion thereof, either to the output optics 329 or a second waste light fiber 328'. The two waste light fibers 328, 328' may be spliced together to form a signal return fiber 328". A lens 327' may be disposed between the variable mirror 321 and the second waste light fiber 328'. The lens 327' may couple the deflected delivered beam 321' to the second waste light fiber 328'. By way of example, the variable mirror 321 may be movable between a first position (shown in phantom) and a second position. In the first position, the delivered beam 215 is permitted to pass through to the output optics 329. In the second position, the delivered beam 215 (or a portion thereof) is deflected towards the lens 327' as the deflected beam 321".

Embodiments of the present invention present several advantages over current techniques for handling thermal loads associated with waste light. Some current wavelength converted optical systems separate unconverted light from wavelength converted light with a dichroic beam splitter and route unconverted light to a beam dump through series of steering mirrors and/or lens. Other systems dump unconverted light in beam dump somewhere in the optical head. Unfortunately, the beam dump absorbs unconverted light and is heated, which raises the beam dump temperature. Heat may be removed from the beam dump, e.g., by conductive or convective transport to remaining portions of the optical head. Alternatively the beam dump may be actively cooled, e.g., by flowing water or air across the beam block. Unfortunately, if the beam dump is not actively cooled, the heat load from unconverted light may become the dominant heat source in the optical head. This can be a significant problem, since there is typically more unconverted light than desired wavelength converted output. Such cooling schemes can add cost, complexity, and weight to the optical head. An alternative is to allow both unconverted and wavelength converted light to pass to the target. Unfortunately, multiple wavelengths incident on the target are typically not desirable.

By way of example, as discussed above input light which has not been wavelength converted due to inefficiencies in the wavelength conversion process may be regarded as waste light. In particular, harmonic conversion processes are often less than 100% efficient. In some situations, the delivered beam 215 may be blocked from delivery to the target by a shutter. In such cases, the delivered beam itself may be regarded as a form of waste light. Leakage light from dichroic beam combiners and splitters in the optical head 106 may also be forms of waste light. Unabsorbed pump light from optical amplifiers, e.g., power amplifier 208, may be a form of waste light. In some embodiments, coupling optics within the output head 106, e.g., coupling optics 302, 322 and output optics 329 may include optical modulators. Unused light from such modulators may be a form of waste light.

Embodiments of the present invention, by contrast, remove waste light from the optical head to a beam dump that is thermally isolated from heat sensitive components of the optical head. The optical head may remain small, simple and relatively inexpensive and may also be placed relatively close to the target. By removing the waste light from the optical head, less heat is dissipated in the optical head. Consequently, the optical head may have a smaller overall size and require less cooling. The thermal loads may be reduced to the point that active cooling is not required. Thus, an optical head in accordance with embodiments of the present invention has no need for water lines or a fan. Thus, leakage risks and undesired air turbulence associated with such cooling systems may be eliminated. Furthermore, by reducing the overall thermal load, components within the optical head are less likely to run at elevated temperatures. This may improve the overall cleanliness of the system since there is a reduced chance of contamination to optical components from outgassing of heated components. In addition, reduced heat loads may also reduce thermal transients in the optical head, since the optical head thermal environment does not need to adjust to the additional heat load. Reduced thermal transients can improve the overall stability of the optical system.

The embodiments described above may be varied in a number of ways without departing from the scope of the present invention. For example, embodiments of the invention are also useful for laser systems as well as amplifier systems. Specifically, the power amplifier 208 in FIG. 2 and FIG. 3 may be replaced by a laser. In other alternative embodiments, waste light collected from the optical head 106 may be usefully employed elsewhere in the system. For example, the waste light may be used as a source of heat that may be used to elevate the temperature of some component. Alternatively, instead of directing the waste light to a beam dump, the waste light may be directed to a photovoltaic cell and used to generate electricity. In addition embodiments may be used in an optical output head without wavelength conversion. The output light from the system may be captured and re-directed to remove output light when not desired, e.g., when a shutter is closed.

Furthermore, if the waste light fiber (e.g., fiber 328 or 328') has sufficient length and sufficient optical absorption, the waste light may be absorbed and the heat generated from the waste light may be dissipated without causing undesirable thermal transients. Consequently, the fiber itself may act as the beam dump. For example, a waste light fiber might have a 5 m length and an absorption of 10 dB/m for the waste light. Thus at the output end of the fiber the power of the waste light would be reduced by 50 dB from its original value. This level of reduction is generally sufficient that no special beam dump is required to dissipate the transmitted waste light.

Figure 6:
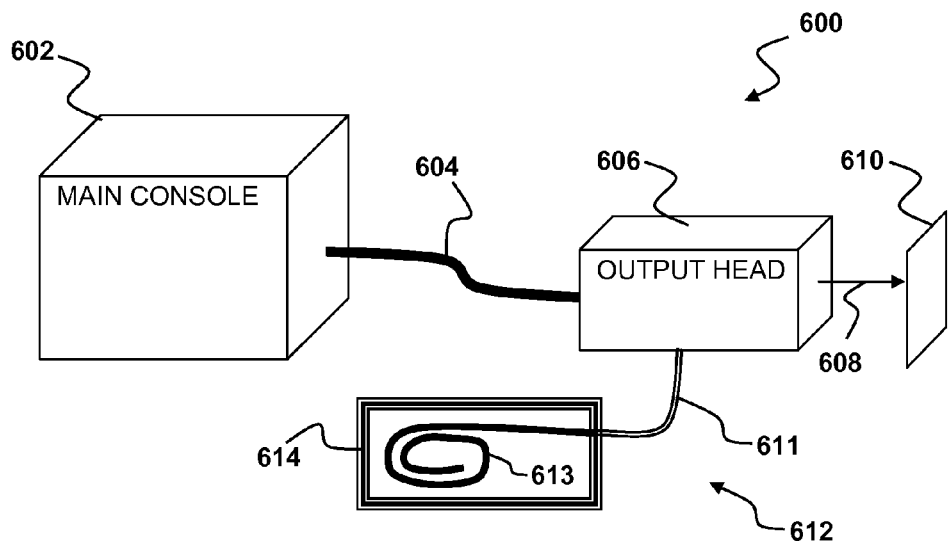
FIG. 6 is an isometric drawing of an optical apparatus according to an alternative embodiment of the present invention.

Advantageously, the waste light fiber might be composed of two or more segments with different absorption properties. An example of the use of such a waste light fiber is shown in FIG. 6, which schematically illustrates a typical optical system 600 illustrating this concept The optical system 600 may include a main console 602 optically coupled by an umbilical 604 to an output head 606. The main console 602, umbilical and output head 606 may be configured as described above. The output head 606 may produce an output beam 608 that is directed towards a target 610. Waste light generated in the output head 606 is captured and coupled to a waste light fiber 612, e.g., as described above or by any other suitable means.

The waste light fiber 612 includes a first section 611 and a second section 613. The first section 611 is optically coupled to components that capture the waste light. The second section 613 is optically coupled to the first section. The two sections 611, 613 may be spliced together. The first section 611 may have minimal absorption loss, so that the waste light is transported efficiently away from its capture region in the optical head 606. The second section 613 may have a relatively higher optical absorption than the first section 611 so that the waste light is primarily dissipated by absorption in the second section. The second section 613 may made sufficiently long that most of the waste light is dissipated. The second section 613 may be coiled if available space is limited. The second section 613 receives waste light from the first section 611 and absorbs the light at a location that is thermally isolated from the optical head. The absorptive second section 613 may be in thermal contact with a heat sink 614 to dissipate the heat generated by absorption of the waste light. The second section may be thermally isolated from the optical head 606 by separating it from the optical head 606 with a sufficiently long first section 611. Alternatively, the second section 616 may be enclosed within a thermally insulating enclosure.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for reducing a thermal load on an optical head, comprising:
   receiving input light at the optical head;
   wavelength converting at least a portion of the input light by a nonlinear optical wavelength conversion process, wherein waste light is a result of incomplete nonlinear wavelength conversion of the input light;
   capturing the waste light at one or more locations in the optical head;
   using a free-space optical path to couple the waste light from the one or more locations to one or more optical fibers external to the optical head that are connected to the optical head by one or more bulkhead connectors; and
   using one or more optical fibers to direct the waste light to a location that is thermally isolated from the one or more locations in the optical head.

2. The method of claim 1 wherein the location that is thermally isolated from the one or more locations in the optical head includes a beam dump.

3. The method of claim 1 wherein the one or more optical fibers include one or more multimode optical fibers.

4. The method of claim 1 wherein using one or more optical fibers includes using two or more separate optical fibers to direct waste light captured at two or more different locations in the optical head to the location that is thermally isolated from the two or more locations in the optical head.

5. The method of claim 1, further comprising generating a beam to be delivered within the optical head, wherein capturing waste light at one or more locations in the optical head includes selectively intercepting the beam to be delivered, whereby the beam to be delivered can be selectively captured as waste light.

6. The method of claim 1, further comprising utilizing the waste light that has been directed to the location that is thermally isolated from the one or more locations in the optical head.

7. The method of claim 6 wherein utilizing the waste light includes utilizing the waste light as a source of heat.

8. The method of claim 6 wherein utilizing the waste light includes directing the waste light to a photovoltaic cell and generating electricity from the waste light with the photovoltaic cell.

9. The method of claim 1 wherein the waste light includes one or more of the following:
   unconverted light from a nonlinear optical wavelength conversion process,
   leakage light from a beam combiner or splitter,
   unabsorbed pump light, or
   unused light from an optical modulator, or unused light from a pulse picker.

10. The method of claim 1 wherein final output light from the nonlinear optical wavelength conversion process is characterized by a power greater than about 0.5Watts.

11. The method of claim 1 wherein the one or more optical fibers have in at least one portion thereof sufficient optical absorption to dissipate the waste light in the optical fiber.

12. The method of claim 11 wherein the optical fiber includes a first portion optically coupled to the one or more locations and a second portion optically coupled to the first portion where the first portion is characterized by a relatively low absorption and the second portion is characterized by a relatively high optical absorption, whereby waste light dissipates in the second portion.

13. The method of claim 12 further comprising thermally isolating the second portion from the one or more locations.

14. An apparatus for reducing a thermal load on an optical head, comprising:
   one or more optical pick-off elements adapted to capture waste light at one or more locations in the optical head;
   an optical wavelength converter disposed in the optical output head, wherein the one or more optical pick-off elements are adapted to capture waste light from the optical wavelength converter, wherein the optical wavelength converter is configured to implement a nonlinear optical wavelength conversion process;
   one or more optical fibers adapted to direct the waste light to a location that is thermally isolated from the one or more locations in the optical head, wherein the one or more optical fibers are external to the optical head and connected to the optical head by one or more bulkhead connectors; and
   one or more free space optical paths between the one or more optical pick-off elements and the one or more bulkhead connectors.

15. The apparatus of claim 14, wherein the one or more optical fibers include one or more multimode optical fibers.

16. The apparatus of claim 15 wherein the one or more optical fibers include a single optical fiber.

17. The apparatus of claim 14 wherein the one or more optical fibers include an optical fiber bundle containing two or more optical fibers.

18. The apparatus of claim 14 wherein the one or more optical fibers include a double-clad optical fiber whereby the waste light is directed into the inner cladding of the double-clad fiber.

19. The apparatus of claim 14 wherein the one or more optical fibers include an optical fiber having a cladding surrounding multiple cores.

20. The apparatus of claim 14 wherein the one or more optical pick-off elements include at least one dichroic beam splitter adapted to transmit a desired wavelength-converted light from the optical wavelength converter and deflect waste light from the wavelength converter.

21. The apparatus of claim 14 wherein the one or more optical pick-off elements include at least one dichroic beam splitter adapted to transmit waste light from the optical wavelength converter and deflect a desired wavelength-converted light from the wavelength converter.

22. The apparatus of claim 14 wherein the optical wavelength converter includes a second harmonic generator.

23. The apparatus of claim 14 wherein the optical wavelength converter includes a third harmonic generator.

24. The apparatus of claim 14 wherein the one or more optical pick-off elements include a shutter adapted to selectively transmit or deflect a delivered beam from the output head.

25. The apparatus of claim 14 wherein the one or more optical pick-off elements include two or more optical pick-off elements adapted to capture waste light from two or more different locations within the optical head, wherein the two or more optical components are adapted to direct the waste light from the two or more different locations into one optical fiber.

26. The apparatus of claim 14 wherein the one or more optical pick-off elements include a first component adapted to direct waste light from a first location to a first optical fiber and a second optical component adapted to direct waste light from a second location to a second optical fiber.

27. The apparatus of claim 26, further comprising a third optical fiber optically coupled to the first and second optical fibers, the third optical fiber being adapted to direct waste light from the first and second optical fibers to the location that is thermally isolated from the one or more locations in the optical head.

28. The apparatus of claim 14, further comprising an optical amplifier disposed in the optical output head.

29. The apparatus of claim 28, further comprising an optical wavelength converter disposed in the optical output head, wherein the optical wavelength converter is optically coupled to the optical amplifier.

30. The apparatus of claim 14, further comprising a laser disposed in the optical output head.

31. The apparatus of claim 30, further comprising an optical wavelength converter disposed in the optical output head, wherein the optical wavelength converter is optically coupled to the laser.

32. The apparatus of claim 14 wherein the one or more optical pick-off elements include an optical fiber having in at least one portion thereof sufficient optical absorption to dissipate the waste light in the optical fiber.

33. The apparatus of claim 32 wherein the optical fiber includes a first portion optically coupled to the one or more locations and a second portion optically coupled to the first portion where the first portion is characterized by a relatively low absorption and the second portion is characterized by a relatively high optical absorption.

34. The apparatus of claim 33 wherein the second portion is thermally isolated from the one or more locations.

35. The apparatus of claim 14, further comprising one or more free space optical paths for output radiation between the one or more optical pick-off elements and a place where the output radiation exits the optical head.

36. An optical apparatus comprising:
a main console;
an optical output head optically coupled to the main console, the optical output head including
an optical wavelength converter configured to implement a nonlinear optical wavelength conversion process;
one or more optical pick-off elements adapted to capture waste light at one or more locations in the optical head;
one or more optical fibers adapted to direct the waste light to a location that is thermally isolated from the one or more locations in the optical head, wherein the one or more optical fibers are external to the optical head and connected to the optical head by one or more bulkhead connectors; and
one or more free space optical paths between the one or more optical pick-off elements and the one or more bulkhead connectors.

37. The apparatus of claim 36, wherein the main console includes a source of seed radiation optically coupled to the optical output head.

38. The apparatus of claim 37, wherein the optical output head includes an optical amplifier optically coupled to the source of seed radiation.

39. The apparatus of claim 38, wherein the optical wavelength converter is optically coupled to the optical amplifier.

40. The apparatus of claim 36 wherein the one or more optical fibers include one or more multimode optical fibers.

41. The apparatus of claim 36 wherein the one or more optical fibers are optically coupled between the optical output head and the main console whereby the waste light is directed to the main console.

42. The apparatus of claim 41 wherein the main console includes a pump source and the optical output head includes an optical amplifier, wherein the one or more optical fibers includes an optical fiber is adapted to carry pump radiation from the pump source to the optical amplifier and to carry waste light from the optical output head to the main console.

43. The apparatus of claim 41 wherein the one or more optical fibers include one or more connectors adapted to optically couple the one or more optical fibers to the optical head or main console.

44. The apparatus of claim 36 wherein the one or more optical components include an optical fiber having in at least one portion thereof sufficient optical absorption to dissipate the waste light in the optical fiber.

45. The apparatus of claim 44 wherein the optical fiber includes a first portion optically coupled to the one or more locations and a second portion optically coupled to the first portion where the first portion is characterized by a relatively low absorption and the second portion is characterized by a relatively high optical absorption.

46. The apparatus of claim 45 wherein the second portion is thermally isolated from the one or more locations.

* * * * *